Patented Oct. 30, 1923.

1,472,716

UNITED STATES PATENT OFFICE.

WHEELER P. DAVEY, OF SCHENECTADY, NEW YORK, ASSIGNOR TO GENERAL ELECTRIC COMPANY, A CORPORATION OF NEW YORK.

PROCESS OF MAKING EMULSIONS.

No Drawing.   Application filed February 27, 1923.   Serial No. 621,675.

*To all whom it may concern:*

Be it known that I, WHEELER P. DAVEY, a citizen of the United States, residing at Schenectady, county of Schenectady, State of New York, have invented certain new and useful Improvements in Processes of Making Emulsions, of which the following is a specification.

The present invention relates to the emulsification of oleaginous material in water, and particularly to the production of water japan.

In my prior Patent 1,294,422 of February 18, 1919, I have described the production of water japan by a process carried out in a substantially enclosed space to prevent the formation of a scum on the japan by the action of the atmosphere.

By my present invention I have provided an improved method of carrying out the manufacture of water japan, which in some of its aspects is of general application for the emulsification of oleaginous material. As a consequence of my invention, the emulsification may be carried out with less time and with less labor and hence at a materially lower cost. The process comprising my present invention may be carried out in an open container.

In accordance with one of the features of my present invention there is produced first a substantially water-free mixture of an emulsifying agent and a material to be emulsified. To this water-free mixture, the addition of high fusing ingredients, such as asphalt can be carried out in a more expeditious and convenient manner than when the asphalt is mixed initially with the other ingredients.

In accordance with another feature of my invention water is added to the composition after the addition of the emulsifying agent, the water being at such a high temperature that its dispersion occurs at a sufficiently rapid rate due to the accompanying lower surface tension to make scumming due to atmospheric action negligible. The emulsion thereupon is cooled to a temperature sufficiently low to prevent scumming.

In the preferred form of my invention, the emulsifying agent consists of soap, conveniently formed in situ by the action of an alkali on one or more of the constituents of the japan. In some cases other emulsifying agents may be used, as for example, casein, or a mixture of different agents may be used.

As a specific example of my invention, about 600 parts of a drying oil, as for example linseed oil or China wood oil, or a mixture of both, are boiled in an open container with about 15 parts by weight of sodium carbonate which has previously been dissolved in 80 parts of boiling water. Other alkaline material such as sodium or potassium hydroxide may be used. In some cases a non-drying oil such, for example, as a mineral oil, oleic acid, castor oil, or soya bean oil also may be added at this stage in order to improve the flexibility of the product. Although the alkali can be added to the oleaginous material in solid undissolved form, I prefer to add with the alkali a small quantity of water to produce a more uniform and complete saponification of a part of the oil by the alkali. The water added at this stage of the process is evaporated after saponification has occurred. In place of alkali a suitable soap may be added and in this case it is unnecessary to add water.

When water has been added the mixture is heated to about 100° C. until violent frothing due to the escape of water vapor has ceased. An asphaltic material, such, for example, as gilsonite, may be added in lumps or other desired form. In a japan having the above content of oil I prefer to add about 600 parts by weight of gilsonite. In some cases other japanning materials, as for example, natural gums, such as rosin or copal or a solution of such gums in an oil may be added at this stage of the process, although gums or a solution of gum in an oil also may be added with the oils at the beginning. Various driers such as manganese resinate or lead resinate may be added at any stage in the process if desired.

The whole composition is heated to a high enough temperature to cause the asphalt to become thoroughly incorporated with the oil and soap mixture. The temperature required for this step depends upon the time and the size of the lumps of the asphalt. For lumps the size of egg coal one-half hour at about 250° C. is sufficient. During this incorporation of the asphalt the heating evaporates the remaining traces of the water added with the alkali. A black, viscous mass is produced which contains the soap uniformly dispersed throughout.

Before adding water the temperature preferably is lowered to about 150° C., as at 250° C. the addition of water produces steam with explosive violence with the accompanying danger of splashing hot material. While the composition is at about 150° C. water heated to about 100° C. is added to produce the desired emulsion. The time required to produce the emulsion may be shortened by adding the water progressively,—starting at a low rate accompanied by stirring. For example in the case of the above mixture and quantity a gallon of water per minute may be added for the first ten minutes. As water is stirred into the composition the rate of water addition may be increased, say, after ten minutes to five gallons per minute for the next twenty minutes and thereafter still faster. The stirring need only be gentle, its purpose being to increase the surface of contact of the water with the japan-soap composition and not to subdivide the composition by a beating or pulverization. Subdivision into droplets occurs spontaneously. The progressive addition of water produces first a dispersion of water in the hot japan composition and then as more water is added, a dispersion of the japan in the water occurs in the form of minute droplets. When the water is first added to the japan, it is kept from evaporating at the temperature of the heated japan by reason of its high state of dispersion. As more and more boiling water is added the temperature of the japan slowly drops until it approximates 100° C. For this reason there is no undue loss of water during the mixing operation.

When a sufficiently dilute emulsion has been produced, the temperature is lowered to a point at which the action of the atmosphere which produces scumming becomes negligible. In the case of the water japan above described this action ceases or becomes negligible at a temperature below about 30° C.

By this method the time required to emulsify the water-free composition made as above described is sufficiently shortened to make scumming by atmospheric action negligible at the temperature specified. For example, to emulsify a given composition of oleaginous material asphalt and soap in about twice its own weight of water requires by this method about one hour, whereas by the method described in my prior patent the same composition required about six hours for emulsification.

Although a loose fitting cover may be provided for the container in which the process is carried out to avoid splashing, no particular care need be exercised to provide an enclosed space.

Various modifications in the above process may be made within the scope of my invention. For example, a japan may be made from asphaltic or gummy materials or both without the use of an oil. I wish to include by the term oleaginous material also such various fusible, amorphous substances as asphalts and gums.

What I claim as new and desire to secure by Letters Patent of the United States, is,—

1. The method of producing an emulsion of an oleaginous material in water which consists in heating said material admixed with an emulsifying agent to a temperature substantially in excess of the boiling point of water and adding water thereto which is heated substantially to the boiling point.

2. The method of making an emulsion which consists in dispersing an emulsifying agent in an oleaginous material to be emulsified, adding water while maintaining the temperature at least as high as the boiling point of water and immediately cooling to a temperature sufficiently low to prevent scumming.

3. The method of producing an emulsion of japan in water which consists in producing a substantially water-free mixture of said japan and a soap, heating said mixture to a temperature of about 150° C., and adding hot water to said heated mixture while stirring.

4. The method of producing an emulsion of japan in water which consists in heating said japan admixed with an emulsifying agent to a temperature at least as high as about 150° C., adding water heated substantially to the boiling point, simultaneously stirring and finally cooling to a temperature sufficiently low to prevent scumming.

5. The method of producing an emulsion of japan in water in an open space which consists in heating said japan with soap in the substantial absence of water to produce an intimate mixture, adding hot water to said mixture while the same is heated to about 150° C., and cooling the resulting emulsion to a temperature sufficiently low to prevent scumming.

6. The process of making a composition capable of emulsification by contact with water which consists in preparing a substantially water-free mixture of an oleaginous material and an emulsifying agent and adding asphalt to said material while heating to a temperature sufficiently high to melt said asphalt.

7. The process of making an emulsion which consists in preparing a substantially water-free mixture of an oleaginous material and a soap, adding an asphaltic material to said mixture while heating to the melting point of said asphalt, and then stirring water into said mixture at a temperature at least as high as 100° C.

8. The method which consists in heating an oleaginous material and a solution of an alkali in water to a temperature sufficiently high to produce saponification, evaporating substantially all of the water from said mixture, adding an asphaltic material to said mixture, heating to a temperature sufficiently high to cause said material to become incorporated in said mixture, bringing the temperature of the resulting composition to about 150° C., adding water thereto heating to about 100° C., and stirring to produce an emulsion.

9. The method of producing an emulsion in water of japan which consists in heating said japan admixed with soap to a temperature of about 150° C., and adding hot water while stirring, the rate of water addition being increased progressively as water becomes incorporated in said mixture.

10. The method of making water japan which consists in heating a japan-forming material and an emulsifying agent to a temperature substantially in excess of the boiling point of water and adding water thereto which is heated substantially to the boiling point until an emulsion of proper consistency is produced.

11. The method of making water japan which consists in producing a substantially water-free mixture of soap and japan-forming material which includes asphalt, heating said mixture to a temperature in excess of the boiling point of water, adding water heated substantially to the boiling point to the mixture, and stirring during the addition of the water to incorporate the water into said material.

12. The method of making a water emulsion, in a container open to the atmosphere, of a mixture of oil, asphaltic material and an emulsifying agent which consists in heating said mixture in excess of the boiling point of water and adding water thereto which is heated substantially to the boiling point until an emulsion of proper consistency is produced.

In witness whereof, I have hereunto set my hand this 26th day of February, 1923.

WHEELER P. DAVEY.